(12) United States Patent
Wang (10) Patent No.: US 10,817,021 B2
(45) Date of Patent: Oct. 27, 2020

(54) DEFORMATION CONTROLLABLE DISPLAY BASED DISPLAY METHOD AND DISPLAY APPARATUS, AND USER EQUIPMENT

(71) Applicant: Beijing Zhigu Rui Tuo Tech Co., Ltd., Beijing (CN)

(72) Inventor: Zhengxiang Wang, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 85 days.

(21) Appl. No.: 15/367,701

(22) Filed: Dec. 2, 2016

(65) Prior Publication Data
US 2017/0178283 A1     Jun. 22, 2017

(30) Foreign Application Priority Data

Dec. 18, 2015   (CN) .......................... 2015 1 0958799

(51) Int. Cl.
 *G06F 1/16*     (2006.01)
(52) U.S. Cl.
 CPC .................................. *G06F 1/1652* (2013.01)
(58) Field of Classification Search
 None
 See application file for complete search history.

(56) References Cited

U.S. PATENT DOCUMENTS

| | | | |
|---|---|---|---|
| 8,988,381 B1* | 3/2015 | Kim | G06F 1/1652 345/108 |
| 2009/0189917 A1 | 7/2009 | Benko | |
| 2010/0020026 A1* | 1/2010 | Benko | G06F 3/041 345/173 |
| 2014/0098075 A1* | 4/2014 | Kwak | G06F 3/0487 345/204 |

(Continued)

FOREIGN PATENT DOCUMENTS

| | | |
|---|---|---|
| CN | 101510008 A | 8/2009 |
| CN | 101925874 A | 12/2010 |

(Continued)

*Primary Examiner* — Peter Hoang
(74) *Attorney, Agent, or Firm* — Sheppard Mullin Richter & Hampton LLP (57) ABSTRACT

The embodiments of the present application disclose a deformation controllable display based display method and display apparatus, and a UE. The method comprises: acquiring target shape information of a spherical surface display object in response to an operation performed on the spherical surface display object; controlling, according to the target shape information, at least a part of a display area of a deformation controllable display to be deformed to a target screen shape, wherein the target screen shape is consistent with a shape of a to-be-displayed part of the spherical surface display object corresponding to the target shape information; and displaying the to-be-displayed part at the at least a part of the display area according to the target shape information. In the technical solutions of the embodiments of the present application, a deformation controllable dis- (Continued)

play is controlled to be deformed to a shape consistent with a shape of a to-be-displayed part of a spherical surface display object, such that the to-be-displayed part is displayed with relatively little distortion by the deformed deformation controllable display.

13 Claims, 6 Drawing Sheets

(56) References Cited

U.S. PATENT DOCUMENTS

2015/0316994 A1    11/2015    Yoon

FOREIGN PATENT DOCUMENTS

| CN | 104781778 A | 7/2015 |
|---|---|---|
| CN | 104919411 A | 9/2015 |
| CN | 105138303 A | 12/2015 |
| EP | 2079052 A1 | 7/2009 |

\* cited by examiner

DEFORMATION CONTROLLABLE DISPLAY BASED DISPLAY METHOD AND DISPLAY APPARATUS, AND USER EQUIPMENT

CROSS REFERENCE TO RELATED APPLICATION

The present application is based on and claims the benefit of priority to Chinese Application No. 201510958799.X, filed on Dec. 18, 2015, the entire contents of which are incorporated herein by reference.

TECHNICAL FIELD

The present application relates to the field of display technologies, and in particular, to a deformation controllable display based display method and display apparatus, and a user equipment (UE).

BACKGROUND

When an electronic map is viewed on a flat panel display, the earth needs to be projected when being presented on a flat panel because the earth is a sphere. However, it is almost impossible to reflect the true spherical world on the flat panel, and any mathematical method used to perform such conversion generates errors and deformation. Therefore, maps presented, by projecting, on flat panel displays are eventually subjected to varying degrees of distortion. A globe presents a map by imitating a shape of the earth, such that the globe can avoid or reduce distortion caused by projection. However, a globe is of a fixed size and is incapable of presenting an electronic map of different scales.

SUMMARY

A possible objective of the embodiments of the present application is: to provide a deformation controllable display based display method.

According to a first aspect, a possible technical solution of the present application provides a deformation controllable device based display method, comprising:

acquiring target shape information of a spherical surface display object in response to an operation performed on the spherical surface display object;

controlling, according to the target shape information, at least a part of a display area of a deformation controllable display to be deformed to a target screen shape, wherein the target screen shape is consistent with a shape of a to-be-displayed part of the spherical surface display object corresponding to the target shape information; and displaying the to-be-displayed part at the at least a part of the display area according to the target shape information.

According to a second aspect, a possible technical solution of the present application provides a deformation controllable device based display apparatus, comprising:

an object shape information acquiring module, configured to acquire target shape information of a spherical surface display object in response to an operation performed on the spherical surface display object;

a deformation control module, configured to control, according to the target shape information, at least a part of a display area of a deformation controllable display to be deformed to a target screen shape, wherein the target screen shape is consistent with a shape of a to-be-displayed part of the spherical surface display object corresponding to the target shape information; and a display module, configured to display the to-be-displayed part at the at least a part of the display area according to the target shape information.

According to a third aspect, a possible technical solution of the present application provides a user equipment (UE). The UE comprises:

a memory, configured to store a program; and a processor, configured to execute the program stored in the memory, wherein the program enables the processor to execute the following operations:

acquiring target shape information of a spherical surface display object in response to an operation performed on the spherical surface display object;

controlling, according to the target shape information, at least a part of a display area of a deformation controllable display to be deformed to a target screen shape, wherein the target screen shape is consistent with a shape of a to-be-displayed part of the spherical surface display object corresponding to the target shape information; and displaying the to-be-displayed part at the at least a part of the display area according to the target shape information.

In at least one technical solution of the embodiments of the present application, a deformation controllable display is controlled to be deformed to a shape consistent with a shape of a to-be-displayed part of a spherical surface display object, such that the to-be-displayed part is displayed with relatively little distortion by using the deformed deformation controllable display.

DETAILED DESCRIPTION

Specific implementing manners of the present application are described in further detail below with reference to the accompanying drawings (in which like elements are denoted by like reference numerals) and embodiments. The following embodiments are intended to describe the present application, but not to limit the scope of the present application. It should be understood by a person skilled in the art that the terms such as "first" and "second" in the present application are merely intended to distinguish between different steps, devices, modules, or the like, and the terms neither represent any particular technical meanings, nor represent a necessary logical order thereof.

Figure 1:
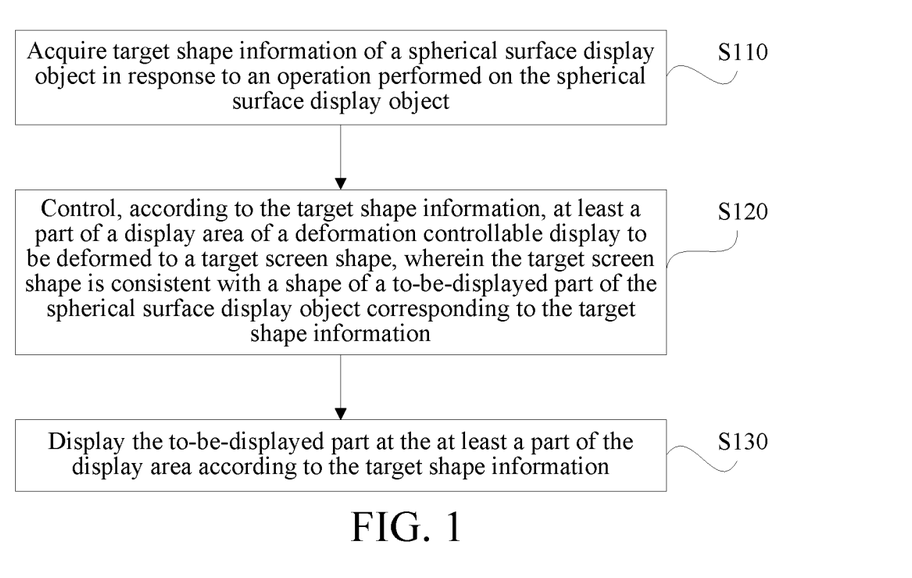
FIG. 1 is a flowchart of a display method according to an embodiment of the present application.

As shown in FIG. 1, an embodiment of the present application provides a deformation controllable device based display method, comprising:

S110: Acquire target shape information of a spherical surface display object in response to an operation performed on the spherical surface display object.

S120: Control, according to the target shape information, at least a part of a display area of a deformation controllable display to be deformed to a target screen shape, wherein the target screen shape is consistent with a shape of a to-be-displayed part of the spherical surface display object corresponding to the target shape information.

S130: Display the to-be-displayed part at the at least a part of the display area according to the target shape information.

For example, a display apparatus provided in the present application functions as an entity for executing this embodiment, and performs s110 to s130. Specifically, the display apparatus may be disposed in a UE by means of software, hardware, or a combination of software and hardware, or the display apparatus is the UE. The UE comprises but not limited to: a smart phone, a pair of smart glasses, a smart helmet, a tablet computer, a notebook computer, and a desktop computer, each of which has a deformation controllable display.

In at least one implementing manner of the embodiments of the present application, a deformation controllable display is controlled to be deformed to a shape consistent with a shape of a to-be-displayed part of a spherical surface display object, such that the to-be-displayed part is displayed with relatively little distortion by using the deformed deformation controllable display.

The steps of the embodiments of the present application are further described by using the following implementing manners.

S110: Acquire target shape information of a spherical surface display object in response to an operation performed on the spherical surface display object.

In this implementing manner, a shape of a surface of the spherical surface display object is a shape that cannot be truly reflected to a flat panel. For example, the surface of the spherical surface display object comprises at least a part of a spherical surface, at least a part of an ellipsoidal surface, and/or at least a part of a paraboloid.

In the embodiments of the present application, the operation is an operation that has an impact on a displayed shape of the spherical surface display object.

In a possible implementing manner, optionally, the operation comprises a display trigger operation.

When the spherical surface display object is not displayed, the display of the spherical surface display object is triggered by using the display trigger operation. Generally, the initially displayed spherical surface display object corresponds to a default shape, and here, it can be considered that the display trigger operation enables the shape of the spherical surface display object to be changed to the default shape.

In another possible implementing manner, optionally, the operation comprises a content scaling operation.

It should be known to a person skilled in the art that when a content scaling operation is performed on a display object, a scaling ratio changes, and therefore an object size also changes.

Using a spherical map as an example of the spherical surface display object, when a content scaling operation is performed on the spherical map, the curvature of the spherical map changes.

In a possible implementing manner, the target shape information of the spherical surface display object comprises scaling ratio information. For the spherical map, a shape of the earth is known, and therefore, a shape of the spherical map can be determined after the scaling ratio information is determined.

Certainly, it should be known to a person skilled in the art that the method of the implementing manners of the present application may be applied to other possible spherical surface display objects in addition to the spherical map. The spherical surface display object may be, for example, an electronic model of a collection with a spherical surface in a museum. By means of the method of this implementing manner, a spherical surface display object of different scales can be conveniently and truly presented.

It should be known to a person skilled in the art that when the spherical surface display object is not a spherical surface, a rotation operation performed on the spherical surface display object may cause a change of the shape of the spherical surface display object. For example, in a scenario in which the spherical surface display object is an ellipsoidal surface display object, when the rotation operation causes a rotation axis of the ellipsoidal surface display object to not coincide with a main axis of the ellipsoidal surface display object, a direction of the main axis of the ellipsoidal surface display object changes. Therefore, in still another possible implementing manner, in response to that a rotation operation performed on the spherical surface display object has an impact on a shape of the spherical surface display object, the operation comprises:

the rotation operation.

Certainly, it should be known to a person skilled in the art that besides the aforementioned operations, another operation that has an impact on a shape of a to-be-displayed part of the spherical surface display object may be used as an operation in the embodiments of the present application.

S120: Control, according to the target shape information, at least a part of a display area of a deformation controllable display to be deformed to a target screen shape, wherein the target screen shape is consistent with a shape of a to-be-displayed part of the spherical surface display object corresponding to the target shape information.

In a possible implementing manner, the shape control of the deformation controllable display may be adjusted by using a deformation mechanism (e.g. a pneumatic structure that is expanded outwards when a pressure is increased, and is contracted inwards when a pressure is decreased) in the deformation controllable display.

For example, in a possible implementing manner, the deformation controllable display is a display array comprising a plurality of display units, wherein each display unit can extend outwards or be retracted inwards along a direction perpendicular to a display surface (that is, deformation is performed by using a pin screen manner).

In another possible implementing manner, deformation of the deformation controllable display is implemented by adjusting at least one deformation control parameter of a deformation controllable material. For example, the deformation controllable display is a deformation controllable flexible display.

The at least a part of the display area herein is a display area used to display the spherical surface display object. For example, in a possible implementing manner, when the deformation controllable display displays the spherical surface display object in a full screen, the at least a part of the display area is the whole display area of the deformation controllable display.

In a possible implementing manner, s120 may comprise:

determining the target screen shape according to the target shape information; and controlling the at least a part of the display area to be deformed to the target screen shape.

In a possible implementing manner, optionally, that the target screen shape is consistent with a shape of a to-be-displayed part corresponding to the target shape information may comprise:

the target screen shape is the same as the shape of the to-be-displayed part corresponding to the target shape information.

The two shapes being the same herein may be that the two shapes are completely the same, or a deviation between the two shapes is within a set deviation range.

In this implementing manner, the target screen shape is the same as the shape of the to-be-displayed part, and therefore, content of the to-be-displayed part can be displayed on the at least a part of the display area of the deformation controllable display without projecting the content of the to-be-displayed part, and the content of the to-be-displayed part can be displayed without distortion.

In a possible implementing manner, the shape of the to-be-displayed part corresponding to the target shape information may exceed a deformation range of the deformation controllable display, and at this time, optionally, that the target screen shape is consistent with a shape of a to-be-displayed part corresponding to the target shape information may comprise:

within a deformation range of the deformation controllable display, the target screen shape is closest to the shape of the to-be-displayed part corresponding to the target shape information.

For example, in a possible implementing manner, the curvature of a spherical map is enough large and therefore is unachievable by the deformation controllable display, and the deformation controllable display may be deformed to a shape with the largest curvature of the deformation controllable display.

In this implementing manner, the target screen shape is not the same as the shape of the to-be-displayed part, and therefore, s130 comprises:

performing projection and deformation, corresponding to the target screen shape, on the to-be-displayed part according to the target shape information; and displaying the projected and deformed to-be-displayed part on the at least a part of the display area.

The projection and deformation herein may be performed by using a common projection technology.

The embodiments of the present application are further described by using the following application scenarios.

Figure 2A:
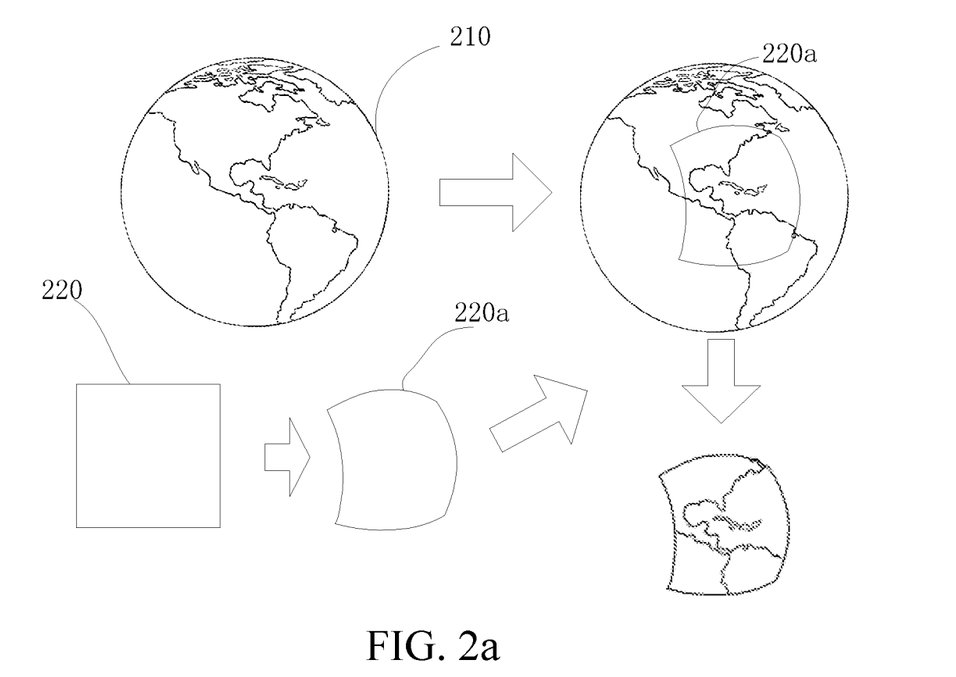
FIG. 2a and FIG. 2b are schematic diagrams of application scenarios according to embodiments of the present application.

As shown in FIG. 2a, in an application scenario, the spherical surface display object is an electronic spherical map 210, and a deformation controllable flexible display 220 is a square when being unfolded to a flat panel.

A user performs a display trigger operation on a display apparatus, for example, click an option of "map", so as to link to a display page of the spherical map 210. In this implementing manner, the display of the spherical map 210 corresponds to a default scaling ratio after being triggered, as shown in FIG. 2a. In some possible implementing manners, after display is triggered, an area corresponding to a location of a user may be used as the default to-be-displayed area according to information about the location of the user.

In this implementing manner, after the user performs the display trigger operation, the display apparatus acquires scaling ratio information of the spherical map 210; information related to the curvature (e.g. information about the curvature, information about a radius) of the spherical map 210 corresponding to a scaling ratio may be obtained according to the scaling ratio information; and the flexible display 220 is controlled to undergo first deformation to form a spherical surface shape with the curvature the same as the curvature of the spherical map 210 corresponding to the scaling ratio (as shown in FIG. 220a). In this application scenario, the spherical map 210 is of a sphere shape.

Therefore, with a scaling ratio, a different to-be-displayed area on the spherical earth 210 has no impact on a deformed shape of the flexible display 220.

Subsequently, the flexible display 220a after the first deformation displays the spherical map 210, and the user can view corresponding first display content in the flexible display 220a, wherein the first display content is completely consistent with content of the spherical map 210 corresponding to the scaling ratio and involves no deformation.

Figure 2B:
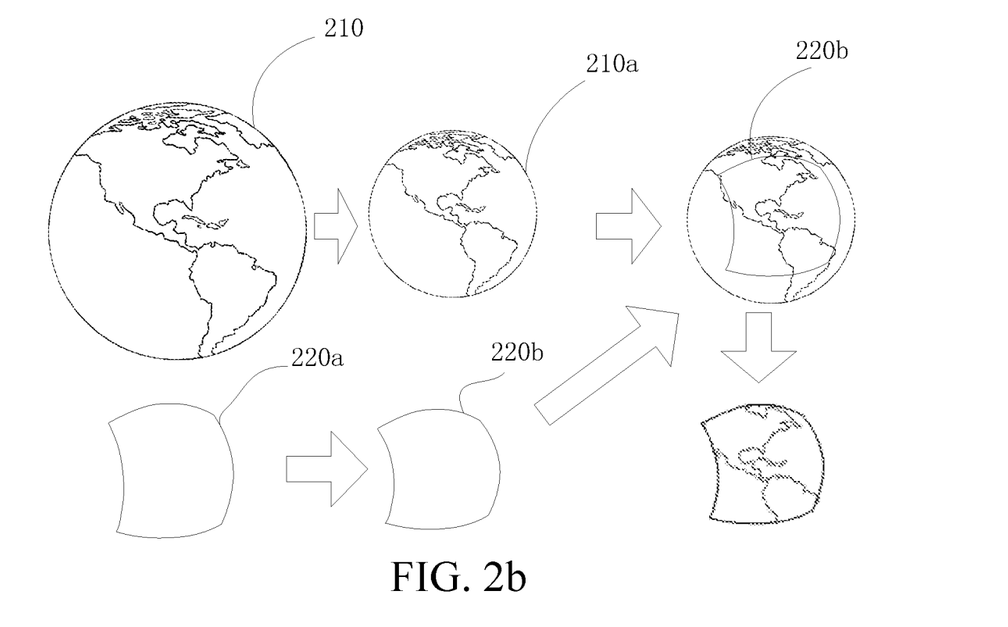

After the user views the first display content displayed on the flexible display 220a after the first deformation of the flexible display 220a, the user may need to view a map with a smaller scale, and therefore performs a ratio scaling operation by using the display apparatus, to cause the spherical map 210 to be scaled and deformed to obtain a deformed shape of the spherical map 210a. In correspondence to the scaling and deformation, the display apparatus acquires scaling ratio information of the deformed spherical map 210a again, and obtains, according to the scaling ratio information, the flexible display 220b after second deformation as shown in FIG. 2b, wherein the curvature of the flexible display 220b after the second deformation is the same as the curvature of the foregoing deformed spherical map 210a.

The deformed spherical map 210a is displayed by using the flexible display 220b after the second deformation, and therefore, the user can view second display content that is displayed on the flexible display 220b after the second deformation and involves no distortion of content of the deformed spherical map 210a.

It can be seen from this application scenario that the method of the embodiments of the present application can display a spherical map of each scaling ratio with reduced distortion, to cause a user to sense true geography.

It should be understood by a person skilled in the art that in the foregoing method of the embodiments of the present application, the value of the serial number of each step described above does not mean an execution sequence, and the execution sequence of each step should be determined according to the function and internal logic thereof, and should not be any limitation on the implementation procedure of the embodiments of the present application.

Figure 3:
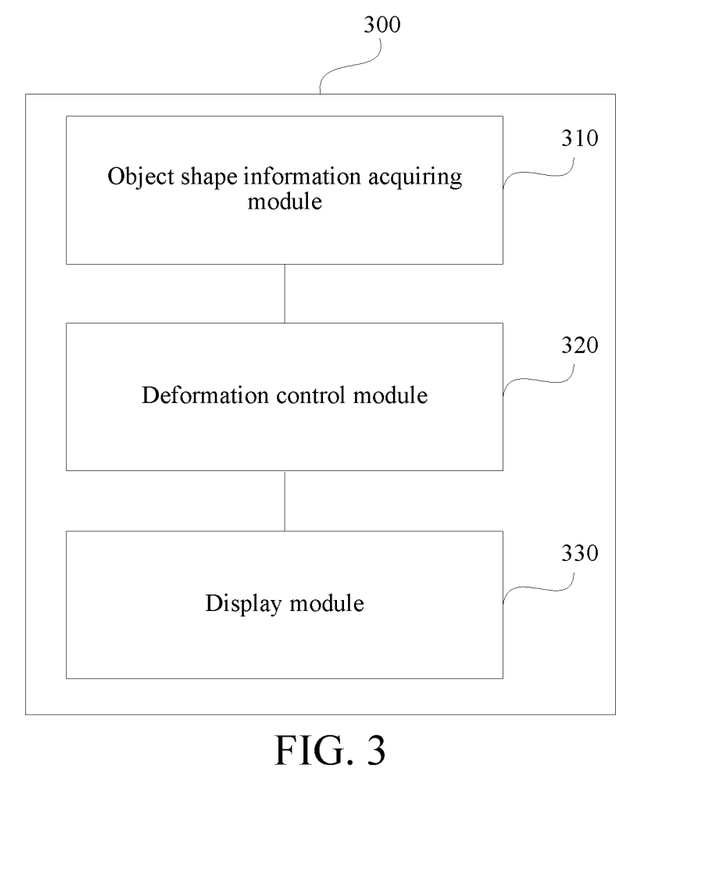
FIG. 3 is a schematic structural block diagram of a display apparatus according to an embodiment of the present application.

As shown in FIG. 3, a possible implementing manner of the embodiments of the present application provides a deformation controllable device based display apparatus 300, comprising:

an object shape information acquiring module 310, configured to acquire target shape information of a spherical surface display object in response to an operation performed on the spherical surface display object;

a deformation control module 320, configured to control, according to the target shape information, at least a part of a display area of a deformation controllable display to be deformed to a target screen shape, wherein the target screen shape is consistent with a shape of a to-be-displayed part of the spherical surface display object corresponding to the target shape information; and a display module 330, configured to display the to-be-displayed part at the at least a part of the display area according to the target shape information.

In at least one implementing manner of the embodiments of the present application, a deformation controllable display is controlled to be deformed to a shape consistent with a shape of a to-be-displayed part of a spherical surface display object, such that the to-be-displayed part is displayed with relatively little distortion by using the deformed deformation controllable display.

The modules of the embodiments of the present application are further described by using the following implementing manners.

Figure 4A:
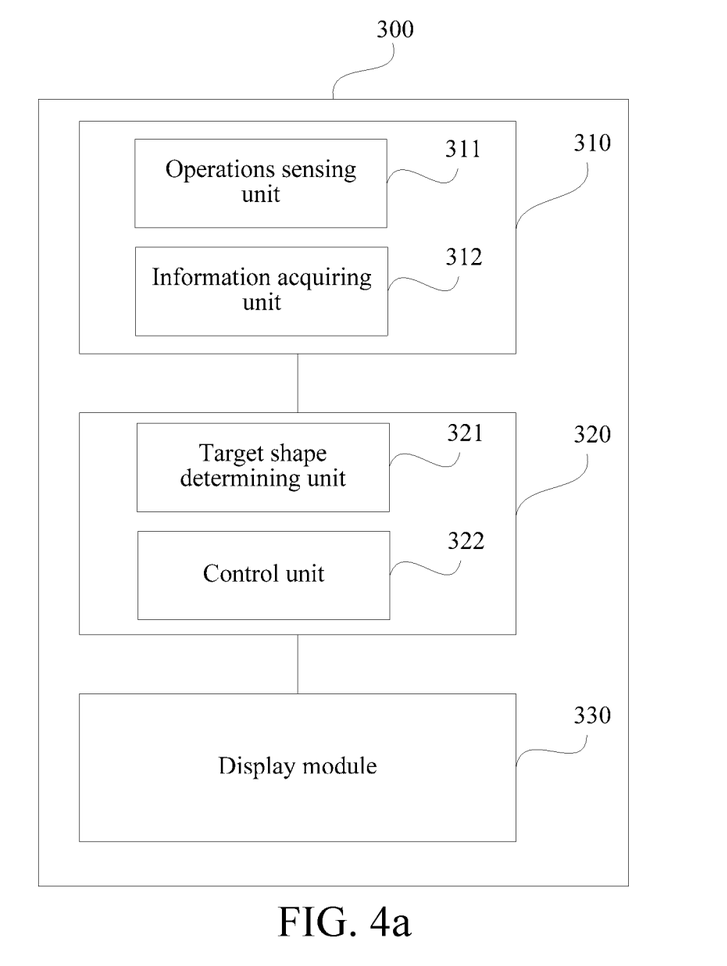
FIG. 4a and FIG. 4b are schematic structural block diagrams of another two display apparatuses according to embodiments of the present application.

In a possible implementing manner, as shown in FIG. 4a, the object shape information acquiring module 310 may comprise:

an operation sensing unit 311, configured to sense the operation, wherein the operation sensing unit 311 may be, for example, a touch screen, a mouse, and the like; and an information acquiring unit 312, configured to acquire, according to the operation, an operation instruction corresponding to the operation, and find target shape information (e.g. the scaling ratio information) corresponding to the operation instruction from a storage module.

In this implementing manner, a shape of a surface of the spherical surface display object is a shape that cannot be truly reflected to a flat panel. For example, the surface of the spherical surface display object comprises at least a part of a spherical surface, at least a part of an ellipsoidal surface, and/or at least a part of a paraboloid.

In a possible implementing manner, the spherical surface display object comprises: a spherical map.

In this implementing manner, the target shape information comprises: scaling ratio information.

Certainly, it should be known to a person skilled in the art that the method of the implementing manners of the present application may be applied to other possible spherical surface display objects in addition to the spherical map. The spherical surface display object may be, for example, an electronic model of a collection with a spherical surface in a museum. By means of the method of this implementing manner, a spherical surface display object of different scales can be conveniently and truly presented.

In the embodiments of the present application, the operation is an operation that has an impact on a displayed shape of the spherical surface display object.

In a possible implementing manner, optionally, the operation may comprise at least one of the following:

a display trigger operation and a content scaling operation.

It should be known to a person skilled in the art that when the spherical surface display object is not a spherical surface, a rotation operation performed on the spherical surface display object may cause a change of the shape of the spherical surface display object. Therefore, in still another possible implementing manner, in response to that a rotation operation performed on the spherical surface display object has an impact on a shape of the spherical surface display object, the operation may further comprise:

the rotation operation.

Certainly, it should be known to a person skilled in the art that besides the aforementioned operations, another operation that has an impact on a shape of a to-be-displayed part of the spherical surface display object may be used as an operation in the embodiments of the present application.

In a possible implementing manner, the shape control of the deformation controllable display may be adjusted by using a deformation mechanism in the deformation controllable display. Therefore, in a possible implementing manner, the deformation control module 320 is a control module of the deformation mechanism.

When the deformation controllable display is the display array described in the foregoing method embodiment, the deformation control module 320 may be an extension and retraction control module configured to control extension and retraction of a plurality of display units along a direction perpendicular to a display surface.

In another possible implementing manner, deformation of the deformation controllable display is implemented by adjusting at least one deformation control parameter of a deformation controllable material. At this time, the deformation control module 320 may be a parameter control module configured to adjust the deformation control parameter.

In this implementing manner, the at least a part of the display area is a display area used to display the spherical surface display object. For example, in a possible implementing manner, when the deformation controllable display displays the spherical surface display object in a full screen, the at least a part of the display area is the whole display area of the deformation controllable display.

In a possible implementing manner, optionally, as shown in FIG. 4a, the deformation control module 320 may comprise:

a target shape determining unit 321, configured to determine the target screen shape according to the target shape information; and a control unit 322, configured to control the at least a part of the display area to be deformed to the target screen shape.

In a possible implementing manner, optionally, that the target screen shape is consistent with a shape of a to-be-displayed part corresponding to the target shape information may comprise:

the target screen shape is the same as the shape of the to-be-displayed part corresponding to the target shape information.

The two shapes being the same herein may be that the two shapes are completely the same, or a deviation between the two shapes is within a set deviation range.

In this implementing manner, the target screen shape is the same as the shape of the to-be-displayed part, and therefore, content of the to-be-displayed part can be displayed on the at least a part of the display area of the deformation controllable display without projecting the content of the to-be-displayed part, and the content of the to-be-displayed part can be displayed without distortion.

In a possible implementing manner, the shape of the to-be-displayed part corresponding to the target shape information may exceed a deformation range of the deformation controllable display, and at this time, optionally, that the target screen shape is consistent with a shape of a to-be-displayed part corresponding to the target shape information may comprise:

within a deformation range of the deformation controllable display, the target screen shape is closest to the shape of the to-be-displayed part corresponding to the target shape information.

For example, in a possible implementing manner, the curvature of a spherical map is enough large and therefore is unachievable by the deformation controllable display, and the deformation controllable display may be deformed to a shape with the largest curvature of the deformation controllable display.

Figure 4B:
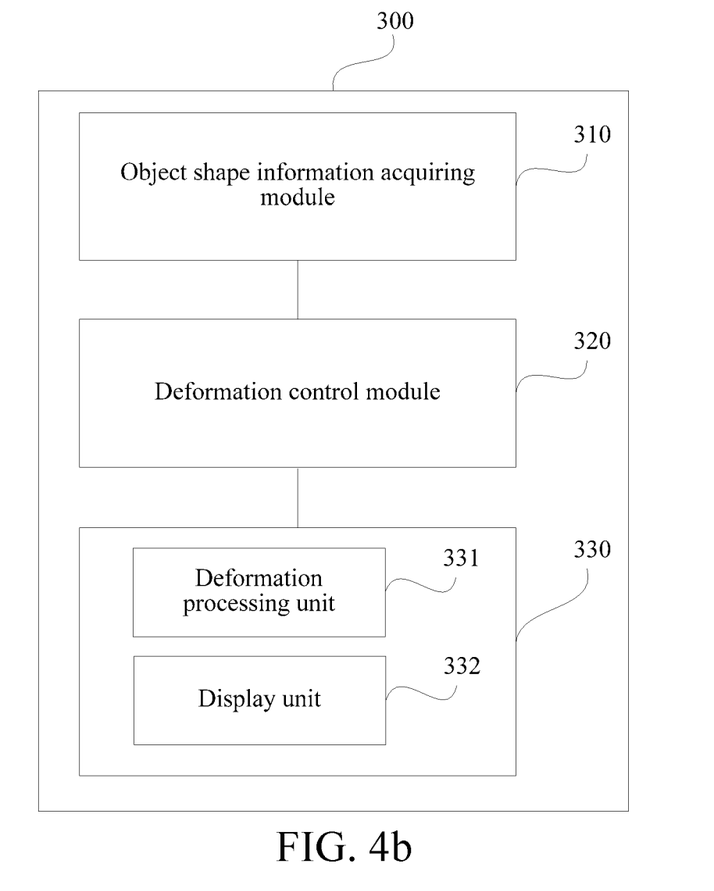

In this implementing manner, the target screen shape is not the same as the shape of the to-be-displayed part, and therefore, as shown in FIG. 4b, the display module 330 comprises:

a deformation processing unit 331, configured to perform projection and deformation, corresponding to the target screen shape, on the to-be-displayed part according to the target shape information; and a display unit 332, configured to display the projected and deformed to-be-displayed part on the at least a part of the display area.

The projection and deformation herein may be performed by using a common projection technology.

For further descriptions of the modules and units in the embodiments of the present application, refer to the corresponding descriptions in the foregoing method embodiments.

Figure 5:
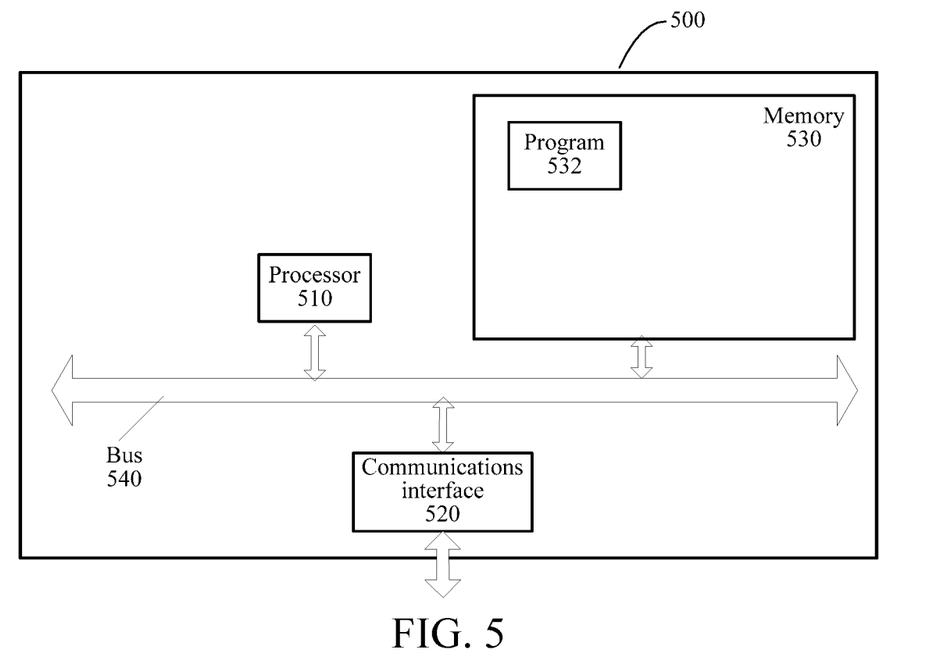
FIG. 5 is a schematic structural block diagram of a UE according to an embodiment of the present application.

FIG. 5 is a schematic structural diagram of another UE 500 according to an embodiment of the present application. Specific embodiments of the present application are not intended to limit the specific implementation of the UE 500. As shown in FIG. 5, the UE 500 may comprise:

a processor 510, a communications interface 520, a memory 530, and a communications bus 540, wherein The processor 510, the communications interface 520, and the memory 530 communicate with each other by using the communications bus 540.

The communications interface 520 is configured to communicate with a network element such as a client.

The processor 510 is configured to execute a program 532, and specifically can perform relevant steps in the foregoing method embodiments.

Specifically, the program 532 may comprise a program code, wherein the program code comprises a computer operation instruction.

The processor 510 may be a central processing unit (CPU), or an application specific integrated circuit (ASIC), or may be configured as one or more integrated circuits that implement the embodiments of the present application.

The memory 530 is configured to store a program 532. The memory 530 may comprise a high speed random access memory (RAM), and may also comprise a non-volatile memory such as at least one magnetic disk storage. The program 532 may be specifically configured to enable the UE 500 to execute the following operations:

acquiring target shape information of a spherical surface display object in response to an operation performed on the spherical surface display object;

controlling, according to the target shape information, at least a part of a display area of a deformation controllable display to be deformed to a target screen shape, wherein the target screen shape is consistent with a shape of a to-be-displayed part of the spherical surface display object corresponding to the target shape information; and displaying the to-be-displayed part at the at least a part of the display area according to the target shape information.

For specific implementation of the steps in the program 532, refer to the corresponding descriptions of corresponding steps and units in the foregoing embodiments, which are not described herein again. It may be clearly understood by a person skilled in the art that, for the purpose of convenient and brief description, reference may be made to the descriptions of corresponding procedures in the foregoing method embodiments for detailed working procedures of the foregoing devices and modules, and details are not described herein again.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The computer software product is stored in a storage medium and comprises several instructions for instructing a computer device (which may be a personal computer, a server, or a network device) to perform all or a part of the steps of the methods in the embodiments of the present application. The foregoing storage medium comprises: any medium that can store program code, such as a USB flash drive, a removable hard disk, a read-only memory (ROM), a random access memory (RAM), a magnetic disk, or an optical disc.

The foregoing implementing manners are only used to describe the present application, but not to limit the present application. A person of ordinary skill in the art can still make various alterations and modifications without departing from the spirit and scope of the present invention; therefore, all equivalent technical solutions also fall within the scope of the present application, and the patent protection scope of the present application should be subject to the claims.

What is claimed is:

1. A display method, implemented by a deformation controllable device having a deformable screen and a deformation mechanism, comprising:
   determining that a sphere-like object is to be displayed;
   first deforming the screen from a flat panel into a sphere-like shape to display the sphere-like object on the first deformed screen having the sphere-like shape;
   performing a scaling operation on the displayed object that changes a curvature of the displayed object;
   in response to changing the curvature of the displayed object, second deforming, by the deformation mechanism, the screen, so that a curvature of the second deformed screen matches the curvature of the displayed object; and
   displaying the object on the second deformed screen, wherein the curvature of the second deformed screen is the same as the curvature of the displayed object.

2. The method of claim 1, wherein, determining that a sphere-like object is to be displayed comprises:
   acquiring a sphere-like shape of the object in response to a display trigger operation and a content scaling operation.

3. The method of claim 1, wherein the sphere-like object to be displayed comprises:
   a spherical map.

4. The method of claim 1, wherein the sphere-like shape comprises:
   a spherical shape, an ellipsoidal shape, and/or a paraboloid shape.

5. The method of claim 1, wherein
   within a deformation range of the deformation controllable device, a shape of the second deformed screen is the closest to a sphere-like shape of the object to be displayed.

6. The method of claim 5, wherein the displaying the object on the second deformed screen comprises:
   performing projection and deformation, corresponding to the shape of the second deformed screen, on the object to be displayed according to the sphere-like shape; and displaying the projected and deformed object on the second deformed screen.

7. A non-transitory computer readable medium, comprising at least one executable instruction which, when executed by a processor, causes the processor to perform operations comprising:
   determining that a sphere-like object is to be displayed;
   first deforming the screen from a flat panel into a sphere-like shape to display the sphere-like object on the first deformed screen having the sphere-like shape;
   performing a scaling operation on the displayed object that changes a curvature of the displayed object;
   in response to changing the curvature of the displayed object, second deforming, by the deformation mechanism, the screen, so that a curvature of the second deformed screen matches the curvature of the displayed object; and
   displaying the object on the second deformed screen, wherein the curvature of the second deformed screen is the same as the curvature of the displayed object.

8. User equipment (UE), comprising
   a memory, configured to store a program;
   a deformation mechanism;
   a deformable screen; and
   a processor, configured to execute the program stored in the memory, wherein the program enables the processor to execute the operations including:
   determining that a sphere-like object is to be displayed;
   first deforming the screen from a flat panel into a sphere-like shape to display the sphere-like object on the first deformed screen having the sphere-like shape;
   performing a scaling operation on the displayed object that changes a curvature of the displayed object;
   in response to changing the curvature of the displayed object, second deforming, by the deformation mechanism, the screen, so that a curvature of the second deformed screen matches the curvature of the displayed object; and
   displaying the object on the second deformed screen, wherein the curvature of the second deformed screen is the same as the curvature of the displayed object.

9. The UE of claim 8 wherein the operations further comprise acquiring a sphere-like shape of the object in response to a display trigger operation and a content scaling operation.

10. The UE of claim 8, wherein the sphere-like object to be displayed comprises:
    a spherical map.

11. The UE of claim 8, wherein the sphere-like shape comprises:
    a spherical shape, an ellipsoidal shape, and/or a paraboloid shape.

12. The UE of claim 8, wherein
    within a deformation range of the deformation controllable device, a shape of the second deformed screen is the closest to a sphere-like shape of the object to be displayed.

13. The UE of claim 12, wherein the operations further comprise:
    performing projection and deformation, corresponding to the shape of the second deformed screen, on the object to be displayed according to the sphere-like shape; and
    displaying the projected and deformed object on the second deformed screen.

* * * * *